Patented Mar. 25, 1947

2,417,898

UNITED STATES PATENT OFFICE 2,417,898

ALABASTER GLASS

William H. Armistead, Corning, N. Y., assignor to Corning Glass Works, Corning, N. Y., a corporation of New York No Drawing. Application April 30, 1945,
Serial No. 591,227

4 Claims. (Cl. 106—53)

This invention relates to compositions for light diffusing glasses of the type known as alabaster, which are useful for illuminating glassware and other purposes requiring uniform diffusion of light as well as for art ware. They are characterized by their lack of selective transmission of visible radiations due to the fact that their light diffusing particles are large enough to scatter light of all visible wave lengths uniformly. They completely obscure the filament of an incandescent lamp while transmitting up to 90% or more of the light therefrom. In prior alabaster glasses, the light diffusing particles were composed of volatile materials such as fluorides, sulfates, chlorides, etc., and it was more or less difficult to maintain a desired degree of diffusibility from one melt to the next.

The primary object of this invention is to provide compositions for alabaster glasses having non-volatile light diffusing particles and good reproducibility.

Another object is to provide compositions for easily reproducible alabaster glasses which are relatively soft and easy to melt and are heat resisting, that is, have a relatively low coefficient of thermal expansion.

To these and other ends the invention consists in a translucent glass comprising 30% to 60% PbO, at least 18% $Al_2O_3$, at least 5 $B_2O_3$, and at least 10% $SiO_2$. When these compositions are melted, minute crystals of an aluminum borate, believed to be $3Al_2O_3 \cdot 1B_2O_3$, are formed as insoluble light diffusing particles which undergo substantially no change in size during cooling or reheating of the glass and which are sufficiently large and uniform in size to give the glass the appearance of alabaster and render it non-selectively diffusing. Since aluminum borate is highly refractory, the light diffusing element of the new glasses is not volatile at glass melting temperatures and consecutive meltings of a given batch produce glasses of the same density or light diffusibility.

The formation of aluminum borate crystals in the new glasses depends mostly upon the alumina content, the boric oxide being at least 5%, and the alumina content is therefore quite critical. No diffusing crystals are produced when the alumina content is less than about 18%. As the alumina content is increased above 18%, the number of diffusing crystals increases until a maximum is reached with an alumina content of about 25%. With a content of about 20% $Al_2O_3$ a desirable glass of relatively high transmission and uniform diffusibility is produced. It is preferable not to exceed about 25% $Al_2O_3$ since more than 25% causes no further increase in density and makes the glass difficult to melt. The boric oxide content of the new glasses should be at least about 5% in order to cause the formation of aluminum borate crystals in the glass.

Neither the silica nor the lead oxide contents within the ranges stated have substantial effect upon the apparent translucent density of the glass. Too much lead oxide or too little silica seriously lowers the durability of the glass and too little lead oxide or too much silica makes it difficult to melt.

Minor amounts, say 1 or 2%, of alkali metal oxides and still larger amounts of oxides of the second periodic group, would not seriously affect the translucency of the new glasses, but their absence is to be preferred. The usual coloring oxides in amounts sufficient to color the glass may, if desired, be added to the compositions in order to produce colored light diffusing glasses.

Since the new glasses contain no alkali metal oxides, their coefficients of thermal expansion are relatively low and the glasses are therefore heat resisting. Their softening temperatures are not, however, excessive and in some compositions are relatively low, considering the absence of alkali metal fluxes.

The following table shows by way of example compositions of the new glasses in percent by weight as calculated from the respective batches:

|  | 1 | 2 | 3 | 4 | 5 | 6 | 7 |
|---|---|---|---|---|---|---|---|
| $SiO_2$ | 30 | 20 | 15 | 30 | 25 | 30 | 20 |
| $Al_2O_3$ | 20 | 20 | 25 | 20 | 25 | 25 | 20 |
| $B_2O_3$ | 5 | 10 | 10 | 10 | 10 | 10 | 20 |
| PbO | 45 | 50 | 50 | 40 | 40 | 35 | 40 |
| Translucency | (1) | (1) | (2) | (1) | (2) | (2) | (1) |

[1] Medium.
[2] Dense.

I claim:

1. A translucent glass comprising 30% to 60% PbO, at least 18% $Al_2O_3$, at least 5% $B_2O_3$, and at least 10% $SiO_2$, which contains light diffusing crystallites of an aluminum borate.

2. A translucent glass comprising 30% to 60% PbO, 18% to 25% $Al_2O_3$, at least 5% $B_2O_3$, and at least 10% $SiO_2$, which contains light diffusing crystallites of an aluminum borate.

3. A translucent glass comprising 30% to 60% PbO, about 20% $Al_2O_3$, at least 5% $B_2O_3$, and at least 10% $SiO_2$, which contains light diffusing crystallites of an aluminum borate.

4. A translucent glass comprising approximately 30% $SiO_2$, 20% $Al_2O_3$, 5% $B_2O_3$, and 45% PbO, which contains light diffusing crystallites of an aluminum borate.

WILLIAM H. ARMISTEAD.

REFERENCES CITED

The following references are of record in the file of this patent:

UNITED STATES PATENTS

| Number | Name | Date |
|---|---|---|
| 1,529,259 | Locke et al. | Mar. 10, 1925 |
| 2,100,391 | Grimm et al. | Nov. 30, 1937 |